United States Patent [19]

Reichelt et al.

[11] Patent Number: 5,418,723
[45] Date of Patent: May 23, 1995

[54] METHOD OF DETERMINING A SET VALUE OF THE ASSISTING FORCE IN A POWER STEERING SYSTEM

[75] Inventors: Werner Reichelt, Esslingen; Peter Frank, Stuttgart, both of Germany

[73] Assignee: Daimler-Benz AG, Germany

[21] Appl. No.: 158,359

[22] Filed: Nov. 29, 1993

Related U.S. Application Data

[63] Continuation of Ser. No. 677,440, Mar. 29, 1991, abandoned.

[30] Foreign Application Priority Data

Jun. 6, 1990 [DE] Germany ............. 40 18 081.6

[51] Int. Cl.⁶ .............................. B62D 5/04
[52] U.S. Cl. ................. 364/424.05; 180/142; 180/143
[58] Field of Search ............. 364/424.01, 424.05; 180/79, 79.1, 140, 141, 142, 143

[56] References Cited

U.S. PATENT DOCUMENTS

| | | | |
|---|---|---|---|
| 4,566,710 | 1/1986 | Furukawa et al. | 180/140 X |
| 4,705,130 | 11/1987 | Fukunaga et al. | 180/140 |
| 4,830,127 | 5/1989 | Ito et al. | 180/79.1 |
| 4,858,134 | 8/1989 | Eto et al. | 364/424.05 |
| 4,957,181 | 9/1990 | Oshita et al. | 180/142 X |
| 4,967,865 | 11/1990 | Schindler | 180/79.1 |
| 4,998,593 | 3/1991 | Karnopp et al. | 180/140 |
| 5,018,070 | 5/1991 | Eguchi | 364/424.05 |
| 5,040,629 | 8/1991 | Matsuoka et al. | 180/141 X |
| 5,076,381 | 12/1991 | Daido et al. | 180/79.1 |
| 5,079,708 | 1/1992 | Brown | 364/424.05 |
| 5,122,958 | 6/1992 | Eto et al. | 364/424.05 |
| 5,151,860 | 9/1992 | Taniguchi et al. | 364/424.05 |

FOREIGN PATENT DOCUMENTS

| | | |
|---|---|---|
| 3424826 | 1/1985 | Germany . |
| 3719172 | 12/1987 | Germany . |
| 3817602 | 12/1988 | Germany . |

*Primary Examiner*—Vincent N. Trans
*Attorney, Agent, or Firm*—Evenson, McKeown, Edwards & Lenahan

[57] ABSTRACT

A method of determining a set value of the assisting force in a power steering system reduces the assisting force in the power steering system as a function of the steering angular velocity (LWG). An estimate of the general driving situation with respect to the cornering force taking place by a variable representing a set value ($a_{yset}$) of the lateral acceleration is derived from the steering angle (LW), by determining a variable representing the lateral acceleration ($a_y$) and by deriving a critical driving state from a deviation of the variable representing the lateral acceleration ($a_y$) from the variable representing the set value ($a_{yset}$) of the lateral acceleration above a threshold value. The reduction of the assisting force in the power steering system as a function of the steering angular velocity LWG takes place only as long as the critical driving state is detected.

32 Claims, 3 Drawing Sheets

METHOD OF DETERMINING A SET VALUE OF THE ASSISTING FORCE IN A POWER STEERING SYSTEM

This is a continuation of application Ser. No. 07/677,440, filed Mar. 29, 1991, now abandoned.

BACKGROUND AND SUMMARY OF THE INVENTION

The present invention relates to a method of determining a set value of the assisting force in a power steering system and, more particularly, to a determining method in which the actual requirement for actuating force in the power steering system is taken into consideration insofar as possible, including estimating the general driving situation with respect to a cornering force taking place by variables such that a reduction in the assisting force in the power steering system as a function of the steering angular velocity takes place only as long as the critical driving state is detected.

A conventional set value determining method is discussed in DE 38 17 602 A1, according to which the torsional moment which occurs in the steering system during steering is sensed by a torsional moment sensor, and the set value of the assisting force in the power steering system is increased with increasing torsional moment. The output signal of the steering angle sensor is used to derive the speed at which the steering wheel is turned. As a function of the value of the speed at which the steering wheel is turned, a damping signal is generated. This means that the set value of the assisting force in the power steering system is decreased with increasing speed at which the steering wheel is turned. Furthermore, the damping signal is increased, i.e. the assisting force in the power steering system is further decreased, when the vehicle speed increases.

It is considered as disadvantageous with this known method that the set value of the assisting force in the power steering system is decreased with increasing speed at which the steering wheel is turned. No account is taken of whether the vehicle driver under certain circumstances in an evasive operation requires a greater assisting force in the power steering system.

Furthermore, DE 34 24 826 A1 discloses the use of suitable variables to deduce a general driving state by averaging. In particular, a distinction is drawn between in-town driving, driving on a motorway, driving on a country road and driving on a road in the mountains, in particular driving over a winding route. The vehicle speed and the steering angle are used as characteristic variables. Furthermore, a load sensor is used. These variables are used to determine the general driving state by averaging. For this driving state, a corresponding assisting force is set in the power steering system. Thus, a greater steering angular velocity (LWG) is used to derive a requirement for a greater assisting force in the power steering system.

Furthermore, DE 37 19 172 A1 describes an increase in the assisting force in the power steering system above a threshold value of the steering angle (LW) in order to compensate for the greater forces in the steering linkage occurring at a steering angle above the threshold value.

An object of the present invention is to provide a method for determining a set value of the assisting force in a power steering system in such a way that the actual requirement for the assisting force in the power steering system is taken into consideration as far as possible.

According to the present invention, this object has been achieved by estimating the general driving situation with respect to a cornering force taking place by a variable representing a set value ($a_{yset}$) of the lateral acceleration being derived from the steering angle (LW), by a variable representing the lateral acceleration ($a_y$) being determined, and by a critical driving state being derived from a deviation of the variable representing the lateral acceleration ($a_y$) from the variable representing the set value ($a_{yset}$) of the lateral acceleration above a threshold value, and reducing the assisting force in the power steering system as a function of the steering angular velocity (LWG) taking place only as long as the critical driving state is detected.

Advantages of the present invention include that, due to the consideration of the actual requirement for the assisting force in the power steering system, inappropriate driver steering maneuvers, i.e. instabilities induced by the driver in critical driving situations, are largely avoided.

In addition, it is possible to deduce, from the set value ($a_{yset}$) of the lateral acceleration obtained and the actual value ($a_y$) of the lateral acceleration occurring, the friction coefficient conditions in the sense of the existence of a disturbance, such as for example a jump in the friction coefficient or a suddenly occurring side wind.

If a vehicle is travelling on a carriage-way with a great friction coefficient and this friction coefficient suddenly decreases (for example due to a sheet of ice), critical driving situations may occur if a lateral acceleration is required, such as for example when travelling around a bend or evading an obstacle. In general, the vehicle driver has adapted his speed to the greater friction coefficient of the carriageway, so that he is then traveling too quickly for the decreased friction coefficient. As a result, it may happen that the cornering force required for achieving the lateral acceleration desired by the vehicle driver is not available at a certain steering angle (LW). As a result, the vehicle driver is again made to carry out a relatively great steering movement, although under certain circumstances the required cornering force may still not be built up as a result of the lower friction coefficient. If, however, the friction coefficient increases again (for example because the vehicle has left the area of the sheet of ice), there is an excessive steering movement and the vehicle builds up a lateral acceleration corresponding to the cornering force then available, which is greater than the acceleration desired by the vehicle driver. In order then to reduce again the excessive lateral acceleration, the vehicle driver must counter-steer, i.e. a rolling of the vehicle may occur.

The present invention avoids the problems in the above-described situation by combining a signal representing the steering angle (LW) together with a signal representing the vehicle lateral acceleration. In the case of a driving state corresponding to the situation described above but judged as uncritical, a correlation exists between the signal representing the steering angle (LW) and the signal representing the vehicle lateral acceleration. Conversely, in the case of a driving state corresponding to the situation described above and judged as critical, a lower correlation or no correlation exists between the signal representing the steering angle (LW) and the signal representing the vehicle lateral acceleration. It is possible in principle to record the time characteristic of the two signals mentioned and compare then with each other. However, the present invention advantageously uses a method generally known as correlation analysis, that is to say the cross-correlation is formed between the signal representing the steering angle (LW) and the signal representing the vehicle lateral acceleration.

BRIEF DESCRIPTION OF THE DRAWINGS

These and other objects, features and advantages of the present invention will become more apparent from the following detailed description of a presently preferred embodiment when taken in conjunction with the accompanying drawings, wherein.

DETAILED DESCRIPTION OF THE DRAWINGS

Figure 1:
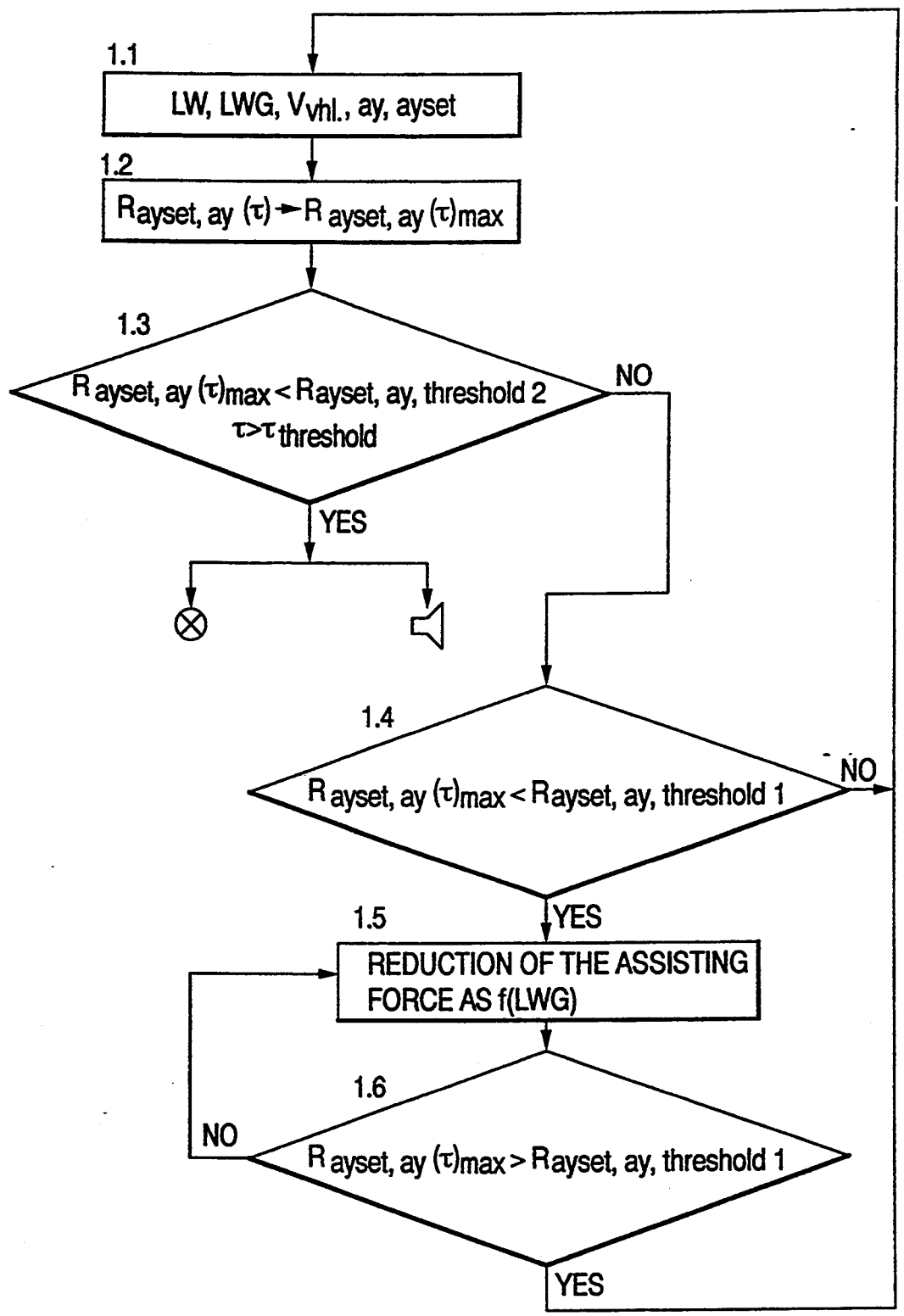
FIG. 1 is a flow chart of one embodiment the method according to the present invention for determining a set value of the assisting force in the power steering system.

As shown in FIG. 1, in step 1.1 of the method according to the present invention, the steering angle (LW) and the steering angular velocity (LWG) are determined. In addition, a determination of the vehicle speed ($V_{vh1}$) and of the lateral acceleration ($a_y$) of the vehicle takes place. A set of value ($a_{yset}$) of the lateral acceleration is determined from the steering angle (LW) and the vehicle speed ($v_{vh1}$).

In step 1.2, a determination of the cross-correlation ($R_{ayset,ay}(\tau)$) is used to form the maximum value of the cross-correlation ($R_{ayset,ay}(\tau)_{max}$) between the set value of the lateral acceleration ($a_{yset}$) of the vehicle obtained from the steering angle (LW) and the vehicle speed ($v_{vh1}$) under optimum friction coefficient conditions and a disturbance-free state (no side wind) and transverse acceleration ($a_y$) of the vehicle.

It is advantageously possible to warn the vehicle driver, with step 1.3, by an acoustic and/or optical signal, if the maximum value of the cross-correlation ($R_{ayset,ay}(\tau)_{max}$) drops below a threshold ($R_{ayset,ay,threshold}$). In an embodiment of the invention with a cross-correlation normalized to the maximum value 1, this threshold ($R_{ayset,ay,threshold}$) may assume the value 0.8.

If, according to the check in step 1.4, the maximum value of the cross-correlation ($R_{ayset,ay}(\tau)_{max}$) drops below a certain threshold value ($R_{ayset,ay,threshold1}$), a set value of the assisting force in a power steering system is determined in step 1.5 such that the assisting force in the power steering system is reduced, with the result that the vehicle driver has to exert a greater manual moment. The value of the threshold ($R_{ayset,ay,threshold2}$) according to step 1.3 is advantageously greater than the value of the threshold value ($R_{ayset,ay,threshold1}$) according to step 1.4. With a cross-correlation normalized to the maximum value 1, the threshold value ($R_{ayset,ay,threshold1}$) may assume the value 0.7.

Figure 4:
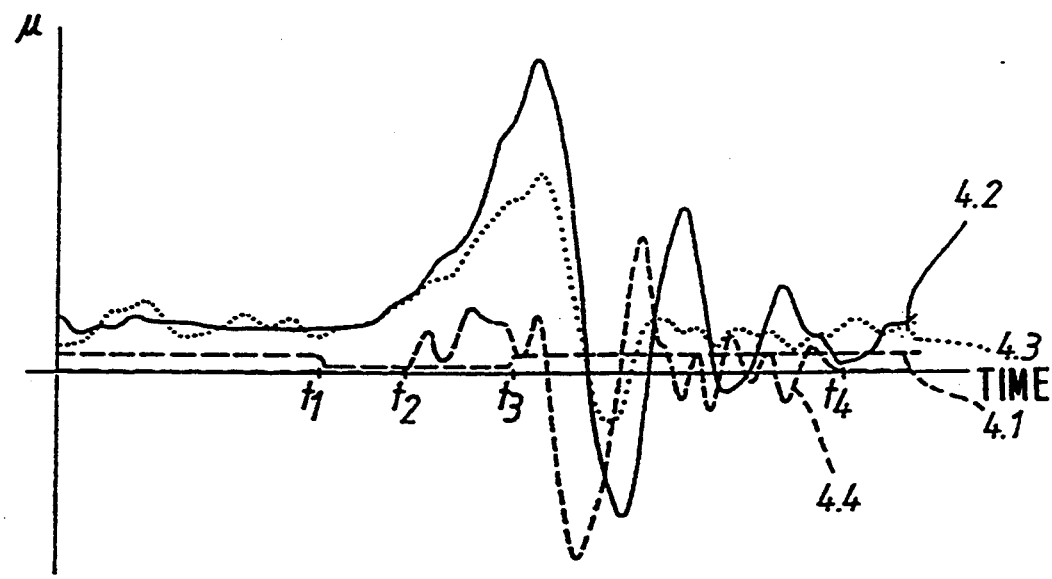
FIG. 4 is a graph of the time characteristic of the steering angle in the case of a $\mu$ jump with and without steering assistance.

The set value of the assisting force in the power steering system can be determined, for example, by an additional moment ($T_{addition}$) corresponding to the curve 4.4 of FIG. 4 being added to the set value of the assisting force in the power steering system derived from the driving conditions. This additional moment ($T_{addition}$) is determined as a function of the steering angular velocity (LWG) applicable at the time, in such a way that this additional moment ($T_{addition}$) becomes greater with increasing steering angular velocity (LWG). The operational sign of this additional moment ($T_{addition}$) is always opposed to the operational sign of the steering angular velocity (LWG). Due to this dependence of the additional moment ($T_{addition}$) on the steering angular velocity (LWG), it is ensured that the additional moment ($T_{addition}$) is built up only if there is an over-reaction by the vehicle driver. If the vehicle driver operates the steering wheel only slowly, i.e. a low steering angular velocity (LWG) occurs, only a low additional moment ($T_{addition}$) is built up according to this low steering angular velocity (LWG), i.e. the steering movement of the vehicle driver is in this case scarcely damped.

Once the additional moment ($T_{addition}$) has been determined, a check takes place in step 1.6 of FIG. 1 as to whether the averaging of the maximum value of the cross-correlation ($R_{ayset,ay}(\tau)_{max}$) over a time period ($t_5$) again exceeds the determined threshold value ($R_{ayset,ay,threshold1}$). It is deduced that the critical driving situation which necessitated the determination of an assisting force in the power steering has ended. The period ($t_5$) is advantageously a few seconds, e.g. 1 to 2 seconds. It is similarly conceivable to use a threshold value other than the threshold value ($R_{ayset,ay,threshold1}$) for the criterion according to step 1.6. The flow of the method according to the present invention then continues with a return to step 1.1.

It is likewise conceivable to check in step 1.6 whether the amount of the steering angle (LW) has oscillated about a steady value within a predetermined threshold value (LW$_{threshold}$). It can be deduced from this that the driving situation which leads to an overshooting of the steering angle (LW) due to actuation of the steering wheel by the vehicle driver has ended. In this case, a return to step 1.1 would then likewise take place. Otherwise, the flow of the method according to the invention then continues with step 1.5, i.e. a new value of the additional moment ($T_{addition}$) is determined.

If, on the other hand, according to the check in step 1.4, the value of the cross-correlation ($R_{ayset,ay}(\tau)_{max}$) lies above the threshold value ($R_{ayset,ay,threshold1}$) it is deduced that what is concerned is an evasive maneuver in which a sufficiently great cornering force can be built up on the basis of the friction coefficient conditions existing. No additional moment ($T_{addition}$) is added to the set value of the assisting force in the power steering system derived from the driving conditions, and a return to step 1.1 takes place.

It is also possible in principle to make deductions from the cross-correlation ($R_{ayset,ay}(\tau)$) as to the friction coefficient conditions and a disturbance-free state (consideration of side wind) in consideration of the general driving conditions (vehicle speed, steering angular velocity LWG, load). If the maximum value of the cross-correlation ($R_{ayset,ay}(\tau)_{max}$) occurs with increasing values of the time shift ($\tau$), the vehicle responds increasingly sluggishly. The reason for this, may for example, be that the vehicle is travelling with a relatively great load. Consequently, it can be deduced from an increasing time shift ($\tau$) at which the maximum value of the cross-correlation ($R_{ayset,ay}(\tau)_{max}$) is reached that a driving state which is becoming critical has been reached and consequently in this case as well a warning signal can advantageously be emitted to the vehicle driver. In the present exemplary embodiment, this check also expediently takes place in step 1.3.

Figure 2:
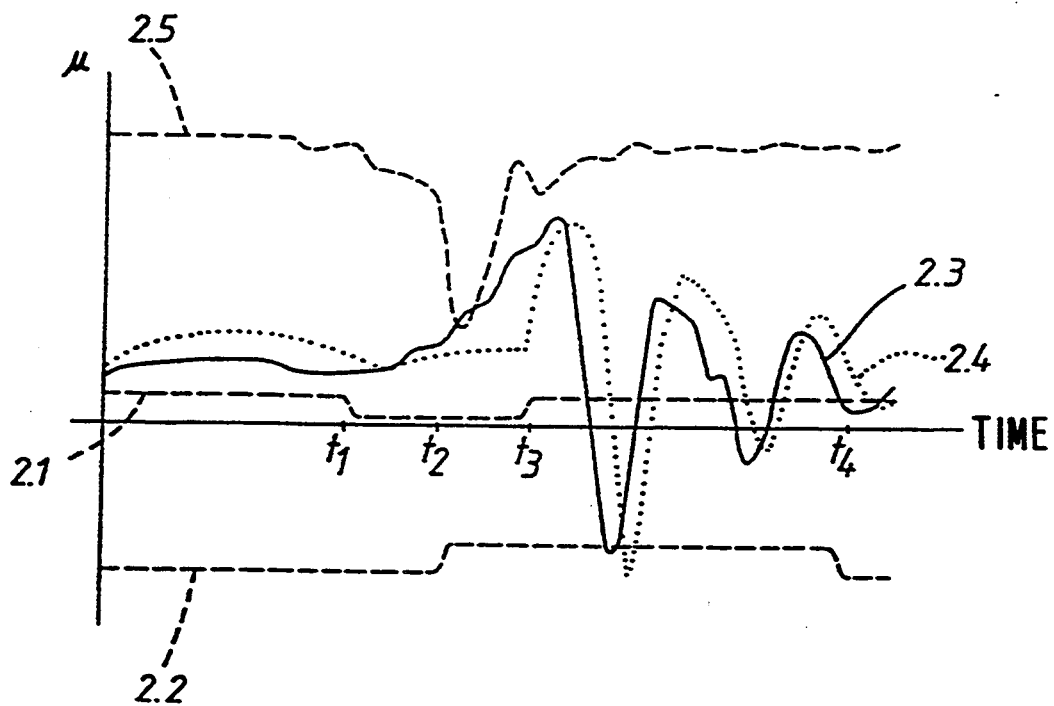
FIG. 2 is a graph of the cross correlation of the steering angle and of the lateral acceleration in the case of a $\mu$ jump.

FIG. 2 shows various curves which fix the order of magnitude of the additional moment ($T_{addition}$) according to the method of FIG. 1. Curve 2.1 shows in this case the time characteristic of the friction coefficient conditions that such a μ jump to low friction coefficient takes place at the instant ($t_1$) and a μ jump to the higher friction coefficient takes place at the instant ($t_3$). Curve 2.2 indicates in this case that the method according to the present invention for determining an assisting force in the power steering system is activated from the instant ($t_2$) to the instant ($t_4$). The instant ($t_2$) is defined by the maximum value of the cross-correlation ($R_{ayset,ay}(\tau)_{max}$) dropping below the threshold value ($R_{ayset,ay,threshold1}$). According to step 1.6, the instant ($t_4$) is in this case defined by the maximum value of the cross-correlation ($R_{ayset,ay}(\tau)_{max}$) again exceeding the determined threshold value ($R_{ayset,ay,threshold1}$).

Alternatively, a definition of the instant ($t_4$) is correspondingly obtained from the condition that the amount of the steering angle (LW) below the threshold value ($LW_{threshold}$) has oscillated about a steady state. The curve 2.3 shows in this case the time characteristic of the steering angle (LW), and the curve 2.4 shows the lateral acceleration occurring on the basis of the steering angle (LW). The curve 2.5 shows the time characteristic of the maximum value of the cross-correlation ($R_{ayset,ay}(\tau)_{max}$).

Figure 3:
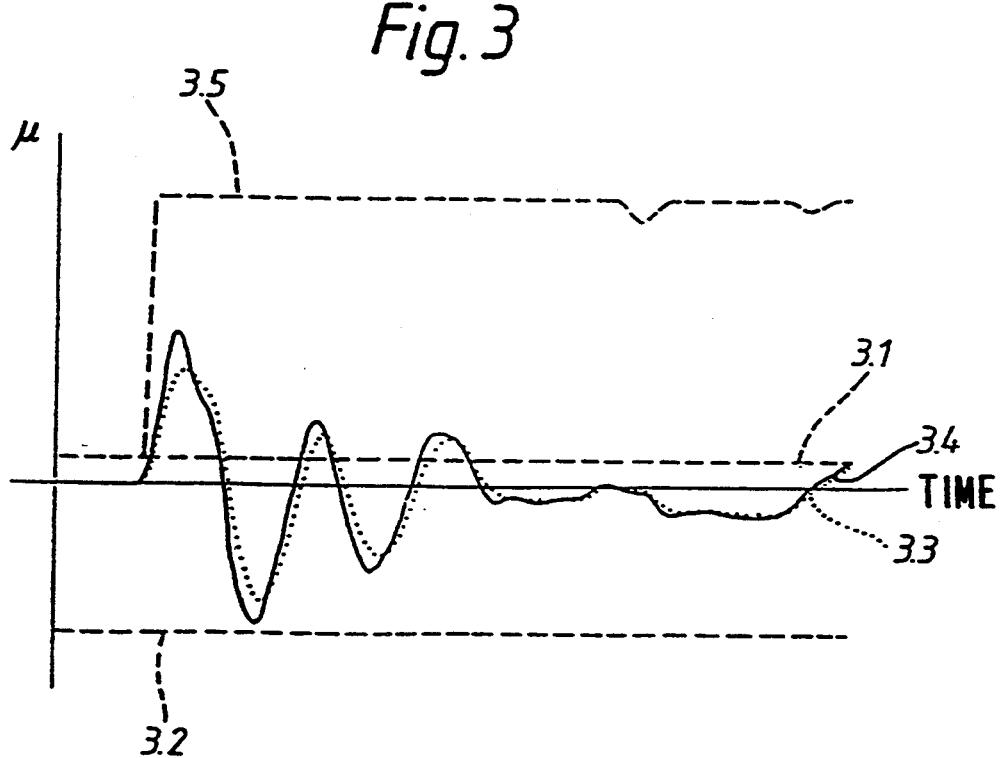
FIG. 3 is a graph of the cross-correlation of the steering angle and of the lateral acceleration in the case of an evasive maneuver with constant $\mu$.

FIG. 3 shows the time characteristic of the corresponding curves of FIG. 2 in the case of an evasive maneuver on a surface having a constant friction coefficient. Curve 3.1 shows the characteristic of the friction coefficient which in this case is constant. The curve 3.2 indicates in this case that the determining method remains inactive during the entire period. The curve 3.3 shows in this situation the time characteristic of the steering angle (LW), and the curve 3.4 shows the lateral acceleration occurring on the basis of the steering angle (LW). The curve 3.5 shows in this case the time characteristic of the maximum value of the cross-correlation ($R_{ayset,ay}(\tau)_{max}$), which characteristic reveals that the maximum value of the cross-correlation ($R_{ayset,ay}(\tau)_{max}$) does not at any instant drop below the threshold value ($R_{ayset,ay,threshold1}$), which explains the characteristic of the curve 3.2.

FIG. 4 shows various curves which demonstrate the difference between the steering angles (LW) obtained with and without use of the method according to the present invention. Here, the curve 4.1 shows the time characteristic of the friction coefficient conditions such that a μ jump to low friction coefficients takes place at the instant ($t_1$) and a μ jump to the higher friction coefficient takes place at the instant ($t_3$). In this situation, the method according to the present invention is activated from the instant ($t_2$) to the instant ($t_4$). The curve 4.2 reveals the time characteristic of the steering angle (LW) if the method according to the invention is not applied. The curve 4.3 shows the time characteristic of the steering angle (LW) if the method according to the invention is applied. The additional moment ($T_{addition}$) corresponding to the curve 4.4 is formed from the changeover time of the steering angle (LW) corresponding to the curve 4.3.

It is thus found with the time characteristic of the steering angle (LW) that, if the method according to the invention is applied, this time characteristic of the steering angle (LW) exhibits far less overshooting than the time characteristic of the steering angle (LW) without the method according to the invention being applied, because over-reactions of the vehicle driver are largely prevented with the μ jump. This reduced overshooting of the steering angle (LW) is obtained in interaction with the reduced overshooting of the lateral acceleration due to the reduced overshooting of the steering angle (LW).

Figure 5:
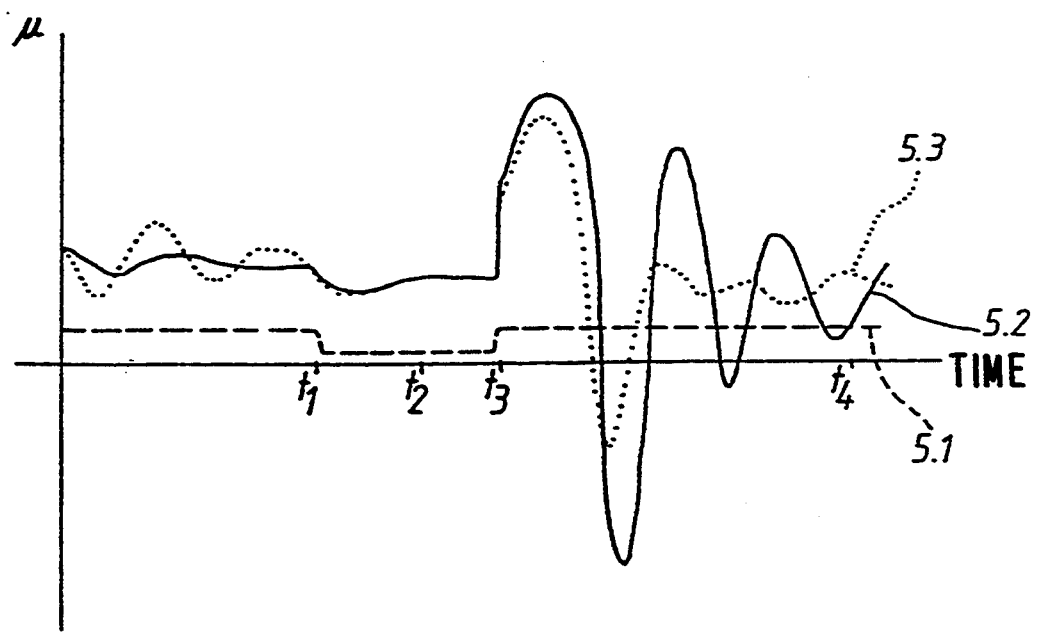
FIG. 5 is a graph of the lateral accelerations obtained with and without steering assistance.

FIG. 5 shows a representation of the lateral accelerations occurring on the basis of the steering angles (LW) corresponding to FIG. 4. In this situation, the curve 5.1 shows the time characteristic of the friction coefficient conditions corresponding to the representation of FIG. 4 such that a μ jump to low friction coefficients takes place at the instant ($t_1$) and a μ jump to the higher friction coefficient takes place at the instant ($t_3$). The method is activated from the instant ($t_2$) to the instant ($t_4$). The curve 5.2 reveals the time characteristic of the lateral acceleration obtained on the basis of the time characteristic of the steering angle (LW) corresponding to the curve 4.2 of FIG. 4 if the method according to the invention is applied. It is found here that the vehicle exhibits far more stabilized handling if the method according to the invention is applied due to the reduced overshooting of the lateral acceleration.

It is quite possible in implementing the method of the present invention to measure, instead of the lateral acceleration, a variable which essentially represents the lateral acceleration, such as, for example, the difference in speed of the front wheels, the yawing moment (correspondingly also the yawing angular velocity) about the vehicle vertical axis or the sideslip angle. Similarly, the set value of the lateral acceleration ($a_{yset}$) may be represented directly by the steering angle (LW). By using a number of variables, a redundancy of the measured quantities can also be accomplished in this case.

The additional moment ($T_{addition}$) determined according to the present invention is advantageously superimposed on the moment by being generated by a known power steering system as a function of various conditions (e.g., vehicle speed, lateral acceleration, load). In one embodiment of the present invention, such an additional moment ($T_{addition}$) is predetermined by a manual moment of no more than about 20 Nm being exerted by the vehicle driver whenever, under normal driving conditions, the power steering system sets an assisting force such that a manual moment of about 6–7 Nm has to be exerted by the vehicle driver.

A further advantageous feature of the present invention is obtained by determining the additional moment ($T_{addition}$) not only as a function of the steering angular velocity (LWG) but also as a function of the vehicle speed ($v_{vh1}$). This can happen by the additional moment ($T_{addition}$) being determined proportionally to the steering angular velocity (LWG) and the vehicle speed ($v_{vh1}$) according to the following equation:

$$T_{addition} = k * LWG * v_{vh1}.$$

The proportionality constant may in this case be chosen of an order of magnitude such that the manual moment to be exerted by the vehicle driver is of an order of magnitude described in the immediately previous paragraph, i.e. about 6–7 Nm.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A method of determining a set value of the assisting force in a power steering system of a vehicle, comprising the steps of:

(a) estimating a general driving situation with respect to cornering force taking place by deriving a variable representing a set value of lateral acceleration from a steering angle, deriving a variable representing said lateral acceleration and thereby deriving a critical driving state during vehicle cornering by a reduction in correlation of the lateral acceleration and steering angle variables when a steering wheel of the power steering system has moved away from a neutral position by a driver of the vehicle from a deviation of said variable representing said lateral acceleration from said set value of said lateral acceleration exceeding a threshold value; and (b) reducing an assisting force in the power steering system experienced by the vehicle driver during turning and returning movements of the steering wheel as a function of steering angular velocity only during the critical driving state to reduce instabilities induced by the vehicle driver in critical driving situations.

2. The method according to claim 1, wherein said variable representing said set value of said lateral acceleration is derived from said steering angle and vehicle speed.

3. The method according to claim 1, wherein said variable representing said set value of said lateral acceleration is directly correlated with said steering angle.

4. The method according to claim 1, wherein said variable representing said lateral acceleration is at least one of said lateral acceleration directly, a difference in speed of vehicle front wheels, a yawing moment about a vehicle vertical axis, a yawing angular velocity about said vehicle vertical axis, and a torsional moment in the power steering system.

5. The method according to claim 4, wherein said variable representing said set value of said lateral acceleration is derived from said steering angle and vehicle speed.

6. The method according to claim 4, wherein said variable representing said set value of said lateral acceleration being directly correlated with said steering angle.

7. The method according to claim 1, wherein the step of estimating includes determining cross-correlation between said variable representing said set value of said lateral acceleration and said variable representing said lateral acceleration, and deriving the beginning of the critical driving situation when a maximum value of said cross-correlation drops below a certain threshold value.

8. The method according to claim 7, wherein said variable representing said set value of said lateral acceleration is derived from said steering angle and vehicle speed.

9. The method according to claim 7, wherein said variable representing said set value of said lateral acceleration is directly correlated with said steering angle.

10. The method according to claim 7, wherein said variable representing said lateral acceleration is at least one of said lateral acceleration directly, a difference in speed of vehicle front wheels, a yawing moment about a vehicle vertical axis, a yawing angular velocity about said vehicle vertical axis, and a torsional moment in the steering system.

11. The method according to claim 1, wherein an end of the critical driving situation is detected when a deviation of said steering angle from a steady value is within range of a threshold value.

12. The method according to claim 11, wherein said variable representing said set value of said lateral acceleration is derived from said steering angle and vehicle speed.

13. The method according to claim 11, wherein said variable representing said set value of said lateral acceleration is directly correlated with said steering angle.

14. The method according to claim 11, wherein said variable representing said lateral acceleration is at least one of said lateral acceleration directly, a difference in speed of vehicle front wheels, a yawing moment about a vehicle vertical axis, a yawing angular velocity about said vehicle vertical axis, and a torsional moment in the power steering system.

15. The method according to claim 11, wherein the step of estimating includes determining cross-correlation between said variable representing said set value of said lateral acceleration and said variable representing said lateral acceleration, and deriving a beginning of the critical driving situation when a maximum value of the cross-correlation drops below a certain threshold value.

16. The method according to claim 1, wherein an end of the critical driving situation is detected when averaging of a maximum value of a cross-correlation over a time period exceeds a determined threshold value over a defined period of time.

17. The method according to claim 16, wherein said variable representing said set value of said lateral acceleration is derived from said steering angle and vehicle speed.

18. The method according to claim 16, wherein said variable representing said set value of said lateral acceleration is directly correlated with said steering angle.

19. The method according to claim 16, wherein said variable representing said lateral acceleration is at least one of said lateral acceleration directly, a difference in speed of vehicle front wheels, a yawing moment about a vehicle vertical axis, a yawing angular velocity about said vehicle vertical axis, and a torsional moment in the steering system.

20. The method according to claim 16, wherein the step of estimating includes determining cross-correlation between said variable representing said set value of said lateral acceleration and said variable representing said lateral acceleration, and deriving a beginning of the critical driving situation when a maximum value of said cross-correlation drops below a certain threshold value.

21. The method according to claim 7, wherein at least one of an acoustic and optical signal indicates to a vehicle driver when the maximum value of the cross-correlation drops below the threshold value.

22. The method according to claim 11, wherein at least one of an acoustic and optical signal indicates to a vehicle driver when the maximum value of the cross-correlation drops below the threshold value.

23. The method according to claim 16, wherein at least one of an acoustic and optical signal indicates to a vehicle driver when the maximum value of the cross-correlation drops below the threshold value.

24. The method according to claim 1, wherein at least one of an acoustic and optical signal indicates to a vehicle driver when the value of a time shift at which the maximum value of a cross-correlation is reached exceeds a predetermined order amount.

25. The method according to claim 1, wherein the step of reduction of the assisting force in the power steering system takes place as a function of said steering angular velocity by an additional moment being applied to the power steering system, said additional moment being determined proportionally to said steering angular velocity and having to be overcome by a vehicle driver by a manual moment exerted on a vehicle steering wheel.

26. The method according to claim 25, wherein said variable representing said set value of said lateral acceleration is derived from said steering angle and vehicle speed.

27. The method according to claim 25, wherein said variable representing said set value of said lateral acceleration is directly correlated with said steering angle.

28. The method according to claim 25, wherein said variable representing said lateral acceleration is at least one of said lateral acceleration directly, a difference in speed of vehicle front wheels, a yawing moment about a vehicle vertical axis, a yawing angular velocity about said vehicle vertical axis, and a torsional moment in the steering system.

29. The method according to claim 25, wherein the step of estimating includes determining cross-correlation between said variable representing said set value of said lateral acceleration and said variable representing said lateral acceleration, and deriving a beginning of the critical driving situation when the maximum value of the cross-correlation drops below a certain threshold value.

30. The method according to claim 25, wherein an end of the critical driving situation is detected when a deviation of said steering angle from a steady value is within a range of a threshold value.

31. The method according to claim 25, wherein an end of the critical driving situation is detected when averaging of said maximum value of a cross-correlation over a time period exceeds a determined threshold value over a defined period of time.

32. The method according to claim 25, wherein said additional moment is determined proportionally to said steering angular velocity and proportionally to vehicle speed.

* * * * *